United States Patent
Jordan, II et al.

(10) Patent No.: US 10,356,303 B1
(45) Date of Patent: Jul. 16, 2019

(54) SYSTEMS AND METHODS FOR CONTROLLING SMART DEVICES BASED UPON IMAGE DATA FROM IMAGE SENSORS

(71) Applicant: STATE FARM MUTUAL AUTOMOBILE INSURANCE COMPANY, Bloomington, IL (US)

(72) Inventors: Jackie O. Jordan, II, Bloomington, IL (US); John Donovan, Bloomington, IL (US); David Turrentine, Bloomington, IL (US); Torri Wollenschlager, Bloomington, IL (US); Bryan R. Nussbaum, Bloomington, IL (US); Deanna Stockweather, Normal, IL (US); Jeffrey W. Stoiber, Bloomington, IL (US); Kerstin Markwardt, Phoenix, AZ (US); Gail L. Carlson, Bloomington, IL (US); Kyle C. Schiebel, Bloomington, IL (US); Troy Winslow, Bloomington, IL (US); Joseph P. Harr, Bloomington, IL (US); Ellakate Wagner, Bloomington, IL (US); Michael Harris, Jr., Normal, IL (US); Jennylind Sun, Bloomington, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 424 days.

(21) Appl. No.: 14/873,783

(22) Filed: Oct. 2, 2015

Related U.S. Application Data

(60) Provisional application No. 62/220,383, filed on Sep. 18, 2015, provisional application No. 62/201,671, (Continued)

(51) Int. Cl.
*G06Q 30/00* (2012.01)
*H04N 5/232* (2006.01)
(Continued)

(52) U.S. Cl.
CPC ..... *H04N 5/23206* (2013.01); *G06K 9/00288* (2013.01); *G06Q 40/08* (2013.01)

(58) Field of Classification Search
CPC . H04N 5/23206; G06Q 40/08; G06K 9/00288
See application file for complete search history.

(56) References Cited

U.S. PATENT DOCUMENTS 3,817,161 A 6/1974 Koplon
5,099,751 A 3/1992 Newman et al.
(Continued)

FOREIGN PATENT DOCUMENTS

CN 202865924 U 4/2013
WO WO-2013/076721 A1 5/2013

OTHER PUBLICATIONS

U.S. Appl. No. 14/692,864, Nonfinal Office Action, dated May 16, 2017.
(Continued)

*Primary Examiner* — Sathyanaraya V Perungavoor
*Assistant Examiner* — Philip P. Dang
(74) *Attorney, Agent, or Firm* — Marshall, Gerstein & Borun LLP; Randall G. Rueth

(57) ABSTRACT

The present embodiments relate to managing the operation of devices within a home or other property based upon received image data. According to certain aspects, a controller within the home may receive, with customer permission or consent, image data from image sensors disposed throughout the home. The controller may analyze the image data in combination with profile data for individuals associated with the home to determine that a certain individual (Continued)

is indicated in the image data. The controller may further determine an action to facilitate based upon the individual being detected in a certain location of the property, and may direct smart devices to perform that action. As a result, the present embodiments may facilitate providing occupant-location based (or occupant-presence or preference based) functionality, functions, or services, and/or directing operations of smart devices located about a property based upon occupant location, presence, preferences, and/or activities at the property.

16 Claims, 6 Drawing Sheets

Related U.S. Application Data filed on Aug. 16, 2015, provisional application No. 62/200,375, filed on Aug. 3, 2015, provisional application No. 62/198,813, filed on Jul. 30, 2015, provisional application No. 62/197,343, filed on Jul. 27, 2015, provisional application No. 62/193,317, filed on Jul. 16, 2015, provisional application No. 62/189,329, filed on Jul. 7, 2015, provisional application No. 62/187,651, filed on Jul. 1, 2015, provisional application No. 62/187,624, filed on Jul. 1, 2015, provisional application No. 62/187,642, filed on Jul. 1, 2015, provisional application No. 62/187,666, filed on Jul. 1, 2015, provisional application No. 62/187,645, filed on Jul. 1, 2015, provisional application No. 62/105,407, filed on Jan. 20, 2015, provisional application No. 62/060,962, filed on Oct. 7, 2014.

(51) Int. Cl.
*G06K 9/00* (2006.01)
*G06Q 40/08* (2012.01)

(56) References Cited

U.S. PATENT DOCUMENTS

| | | | |
|---|---|---|---|
| 5,128,859 A | 7/1992 | Carbone et al. | |
| 5,554,433 A | 9/1996 | Perrone, Jr. et al. | |
| 6,023,762 A * | 2/2000 | Dean | G06F 21/34 |
| | | | 380/255 |
| 6,155,324 A | 12/2000 | Elliott et al. | |
| 6,222,455 B1 | 4/2001 | Kaiser | |
| 6,526,807 B1 | 3/2003 | Doumit et al. | |
| 6,812,848 B2 | 11/2004 | Candela | |
| 7,030,767 B2 | 4/2006 | Candela | |
| 7,194,416 B1 | 3/2007 | Provost et al. | |
| 7,309,216 B1 | 12/2007 | Spadola, Jr. et al. | |
| 7,598,856 B1 | 10/2009 | Nick et al. | |
| 7,715,036 B2 * | 5/2010 | Silverbrook | B41J 3/445 |
| | | | 358/1.15 |
| 7,809,587 B2 | 10/2010 | Dorai et al. | |
| 7,813,822 B1 * | 10/2010 | Hoffberg | G06K 9/00369 |
| | | | 381/73.1 |
| 8,031,079 B2 | 10/2011 | Kates | |
| 8,041,636 B1 | 10/2011 | Hunter et al. | |
| 8,106,769 B1 | 1/2012 | Maroney et al. | |
| 8,229,861 B1 | 7/2012 | Trandal et al. | |
| 8,280,633 B1 | 10/2012 | Eldering et al. | |
| 8,289,160 B1 | 10/2012 | Billman | |
| 8,316,237 B1 * | 11/2012 | Felsher | H04L 9/0825 |
| | | | 380/282 |
| 8,400,299 B1 | 3/2013 | Maroney et al. | |
| 8,527,306 B1 | 9/2013 | Reeser et al. | |
| 8,533,144 B1 | 9/2013 | Reeser et al. | |
| 8,595,034 B2 * | 11/2013 | Bauer | G06Q 40/02 |
| | | | 434/322 |
| 8,596,293 B2 | 12/2013 | Mous et al. | |
| 8,605,209 B2 | 12/2013 | Becker | |
| 8,620,841 B1 | 12/2013 | Filson et al. | |
| 8,621,097 B2 | 12/2013 | Venkatakrishnan et al. | |
| 8,650,048 B1 | 2/2014 | Hopkins, III et al. | |
| 8,694,501 B1 | 4/2014 | Trandal et al. | |
| 8,712,893 B1 | 4/2014 | Brandmaier et al. | |
| 8,730,039 B1 | 5/2014 | Billman | |
| 8,731,975 B2 | 5/2014 | English et al. | |
| 8,749,381 B1 | 6/2014 | Maroney et al. | |
| 9,049,168 B2 | 6/2015 | Jacob et al. | |
| 9,280,252 B1 | 3/2016 | Brandmaier et al. | |
| 9,424,606 B2 | 8/2016 | Wilson, II et al. | |
| 9,429,925 B2 | 8/2016 | Wait | |
| 9,652,976 B2 | 5/2017 | Bruck et al. | |
| 9,654,434 B2 | 5/2017 | Sone et al. | |
| 2002/0040306 A1 | 4/2002 | Sugiyama et al. | |
| 2004/0054789 A1 | 3/2004 | Breh et al. | |
| 2004/0211228 A1 | 10/2004 | Nishio et al. | |
| 2005/0030175 A1 | 2/2005 | Wolfe | |
| 2005/0080520 A1 * | 4/2005 | Kline | B03B 9/06 |
| | | | 701/1 |
| 2005/0139420 A1 | 6/2005 | Spoltore et al. | |
| 2005/0251427 A1 | 11/2005 | Dorai et al. | |
| 2005/0275527 A1 | 12/2005 | Kates | |
| 2006/0033625 A1 | 2/2006 | Johnson et al. | |
| 2006/0154642 A1 * | 7/2006 | Scannell, Jr. | A01G 9/02 |
| | | | 455/404.1 |
| 2008/0018474 A1 | 1/2008 | Bergman et al. | |
| 2008/0019392 A1 | 1/2008 | Lee | |
| 2008/0184272 A1 | 7/2008 | Brownewell | |
| 2008/0285797 A1 | 11/2008 | Hammadou | |
| 2009/0001891 A1 | 1/2009 | Patterson | |
| 2009/0044595 A1 | 2/2009 | Vokey | |
| 2009/0243852 A1 | 10/2009 | Haupt et al. | |
| 2009/0259581 A1 | 10/2009 | Horowitz et al. | |
| 2009/0265193 A1 | 10/2009 | Collins et al. | |
| 2010/0073840 A1 | 3/2010 | Hennessey, Jr. | |
| 2010/0235285 A1 * | 9/2010 | Hoffberg | G06Q 20/401 |
| | | | 705/75 |
| 2010/0299217 A1 | 11/2010 | Hui | |
| 2011/0003577 A1 | 1/2011 | Rogalski et al. | |
| 2011/0077875 A1 | 3/2011 | Tran et al. | |
| 2011/0112660 A1 | 5/2011 | Bergmann et al. | |
| 2011/0161117 A1 | 6/2011 | Busque et al. | |
| 2012/0016695 A1 | 1/2012 | Bernard et al. | |
| 2012/0101855 A1 * | 4/2012 | Collins | G06Q 40/08 |
| | | | 705/4 |
| 2012/0116820 A1 | 5/2012 | English et al. | |
| 2012/0166115 A1 | 6/2012 | Apostolakis | |
| 2012/0188081 A1 | 7/2012 | Van Katwijk | |
| 2012/0265586 A1 | 10/2012 | Mammone | |
| 2012/0290333 A1 | 11/2012 | Birchall | |
| 2013/0049950 A1 | 2/2013 | Wohlert | |
| 2013/0096960 A1 | 4/2013 | English et al. | |
| 2013/0144486 A1 * | 6/2013 | Ricci | H04W 4/90 |
| | | | 701/36 |
| 2013/0159021 A1 * | 6/2013 | Felsher | G06F 19/328 |
| | | | 705/3 |
| 2013/0226624 A1 | 8/2013 | Blessman et al. | |
| 2013/0234840 A1 | 9/2013 | Trundle et al. | |
| 2013/0290033 A1 | 10/2013 | Reeser et al. | |
| 2014/0122133 A1 | 5/2014 | Weisberg et al. | |
| 2014/0136242 A1 | 5/2014 | Weekes et al. | |
| 2014/0180723 A1 | 6/2014 | Cote et al. | |
| 2014/0201315 A1 | 7/2014 | Jacob et al. | |
| 2014/0201844 A1 * | 7/2014 | Buck | G06F 21/50 |
| | | | 726/26 |
| 2014/0222329 A1 | 8/2014 | Frey | |
| 2014/0222469 A1 | 8/2014 | Stahl et al. | |
| 2014/0238511 A1 | 8/2014 | Klicpera | |
| 2014/0244997 A1 | 8/2014 | Goel et al. | |
| 2014/0266717 A1 | 9/2014 | Warren et al. | |
| 2014/0303801 A1 | 10/2014 | Ahn et al. | |
| 2014/0340216 A1 | 11/2014 | Puskarich | |
| 2014/0358592 A1 | 12/2014 | Wedig et al. | |
| 2014/0379156 A1 | 12/2014 | Kamel et al. | |
| 2015/0154712 A1 | 6/2015 | Cook | |
| 2015/0160636 A1 | 6/2015 | McCarthy, III et al. | |

(56) References Cited

U.S. PATENT DOCUMENTS

| | | |
|---|---|---|
| 2015/0163412 A1 | 6/2015 | Holley et al. |
| 2015/0170288 A1 | 6/2015 | Harton et al. |
| 2015/0206249 A1 | 7/2015 | Fini |
| 2015/0332407 A1 | 11/2015 | Wilson, II et al. |
| 2015/0364028 A1 | 12/2015 | Child et al. |
| 2016/0018226 A1 | 1/2016 | Plocher et al. |
| 2016/0078744 A1 | 3/2016 | Gieck |
| 2016/0104250 A1 | 4/2016 | Allen et al. |
| 2017/0304659 A1 | 10/2017 | Chen et al. |

OTHER PUBLICATIONS

U.S. Appl. No. 14/692,946, Nonfinal Office Action, dated Apr. 4, 2017.
U.S. Appl. No. 14/692,961, Nonfinal Office Action, dated Apr. 14, 2017.
U.S. Appl. No. 14/693,021, Nonfinal Office Action, dated Jun. 30, 2017.
U.S. Appl. No. 14/693,034, Nonfinal Office Action, dated May 17, 2017.
U.S. Appl. No. 14/693,039, Nonfinal Office Action, dated Jun. 5, 2017.
U.S. Appl. No. 14/693,057, Nonfinal Office Action, dated Aug. 21, 2017.
U.S. Appl. No. 14/873,823, Final Office Action, dated Mar. 15, 2017.
U.S. Appl. No. 14/873,823, Nonfinal Office Action, dated Jun. 21, 2017.
U.S. Appl. No. 14/873,823, Nonfinal Office Action, dated Nov. 30, 2016.
U.S. Appl. No. 14/692,943, Nonfinal Office Action, dated Sep. 12, 2017.
U.S. Appl. No. 14/692,961, Final Office Action, dated Sep. 1, 2017.
U.S. Appl. No. 14/693,032, Nonfinal Office Action, dated Sep. 7, 2017.
U.S. Appl. No. 14/873,864, Notice of Allowance, dated Aug. 28, 2017.
U.S. Appl. No. 14/873,864, Final Office Action, dated Dec. 2, 2016.
U.S. Appl. No. 14/873,864, Nonfinal Office Action, dated Apr. 5, 2017.
U.S. Appl. No. 14/873,864, Nonfinal Office Action, dated Jul. 14, 2016.
Knutsen, Confusion about causation in insurance: solutions for catastrophic losses, Ala. L. Rev., 5:957-1023 (2010).
U.S. Appl. No. 14/692,864, Final Office Action, dated Nov. 8, 2017.
U.S. Appl. No. 14/692,946, Final Office Action, dated Oct. 30, 2017.
U.S. Appl. No. 14/692,953, Nonfinal Office Action, dated Sep. 19, 2017.
U.S. Appl. No. 14/692,961, Nonfinal Office Action, dated Dec. 28, 2017.
U.S. Appl. No. 14/693,034, Notice of Allowance, dated Oct. 25, 2017.
U.S. Appl. No. 14/693,039, Final Office Action, dated Dec. 15, 2017.
U.S. Appl. No. 14/873,722, Nonfinal Office Action, dated Dec. 5, 2017.
U.S. Appl. No. 14/873,823, Final Office Action, dated Nov. 3, 2017.
U.S. Appl. No. 14/873,864, Notice of Allowance, dated Dec. 21, 2017.
U.S. Appl. No. 14/873,914, Nonfinal Office Action, dated Dec. 26, 2017.
U.S. Appl. No. 14/873,942, Nonfinal Office Action, dated Nov. 22, 2017.
U.S. Appl. No. 14/693,021, Final Office Action, dated Jan. 25, 2018.
U.S. Appl. No. 14/693,057, Final Office Action, dated Feb. 7, 2018.
U.S. Appl. No. 14/873,823, Nonfinal Office Action, dated Feb. 23, 2018.
U.S. Appl. No. 14/873,864, Corrected Notice of Allowability, dated Jan. 18, 2018.
U.S. Appl. No. 14/873,864, Corrected Notice of Allowance, dated Jan. 18, 2018.

\* cited by examiner

SYSTEMS AND METHODS FOR CONTROLLING SMART DEVICES BASED UPON IMAGE DATA FROM IMAGE SENSORS

CROSS-REFERENCE TO RELATED APPLICATIONS

This application claims benefit of the filing date of U.S. Provisional Patent Application Nos. 62/060,962 (filed Oct. 7, 2014, and entitled "SYSTEMS AND METHODS FOR MANAGING DEVICES WITHIN A CONNECTED PROPERTY AND INSURANCE POLICIES ASSOCIATED THEREWITH"); 62/105,407 (filed Jan. 20, 2015, and entitled "SYSTEMS AND METHODS FOR MANAGING DEVICES WITHIN A CONNECTED PROPERTY AND INSURANCE POLICIES ASSOCIATED THEREWITH"); 62/187,624 (filed Jul. 1, 2015, and entitled "SYSTEMS AND METHODS FOR FACILITATING DEVICE REPLACEMENT WITHIN A CONNECTED PROPERTY"); 62/187,645 (filed Jul. 1, 2015, and entitled "SYSTEMS AND METHODS FOR MANAGING BUILDING CODE COMPLIANCE FOR A PROPERTY"); 62/187,651 (filed Jul. 1, 2015, and entitled "SYSTEMS AND METHODS FOR AUTOMATICALLY GENERATING AN ESCAPE ROUTE"); 62/187,642 (filed Jul. 1, 2015, and entitled "SYSTEMS AND METHODS FOR ANALYZING SENSOR DATA TO DETECT PROPERTY INTRUSION EVENTS"); 62/187,666 (filed Jul. 1, 2015, and entitled "SYSTEMS AND METHODS FOR IMPROVED ASSISTED OR INDEPENDENT LIVING ENVIRONMENTS"); 62/189,329 (filed Jul. 7, 2015, and entitled "SYSTEMS AND METHODS FOR MANAGING WARRANTY INFORMATION ASSOCIATED WITH DEVICES POPULATED WITHIN A PROPERTY"); 62/193,317 (filed Jul. 16, 2015, and entitled "SYSTEMS AND METHODS FOR MANAGING SMART DEVICES BASED UPON ELECTRICAL USAGE DATA"); 62/197,343 (filed Jul. 27, 2015, and entitled "SYSTEMS AND METHODS FOR CONTROLLING SMART DEVICES BASED UPON IMAGE DATA FROM IMAGE SENSORS"); 62/198,813 (filed Jul. 30, 2015, and entitled "SYSTEMS AND METHODS FOR MANAGING SERVICE LOG INFORMATION"); 62/200,375 (filed Aug. 3, 2015, and entitled "SYSTEMS AND METHODS FOR AUTOMATICALLY RESPONDING TO A FIRE"); 62/201,671 (filed Aug. 6, 2015, and entitled "SYSTEMS AND METHODS FOR AUTOMATICALLY MITIGATING RISK OF DAMAGE FROM BROKEN CIRCUITS"); 62/220,383 (filed Sep. 18, 2015, and entitled "METHODS AND SYSTEMS FOR RESPONDING TO A BROKEN CIRCUIT")—which are all hereby incorporated by reference in their entireties.

FIELD OF THE DISCLOSURE

The present disclosure generally relates to managing a connected property. More particularly, the present disclosure relates to facilitating various operations and functionalities associated with analyzing image data and facilitating device operation accordingly.

BACKGROUND

With the proliferation of the "internet of things," more household devices and items are gaining communication and network connectivity capabilities. The new capabilities are enabling easier data detection and more accurate information and metrics. However, the channels to control and maintain devices and items as a response to certain conditions may be limited. Additionally, current insurance policy processing systems associated with homeowner and personal property insurance may not account for the connected devices and/or generally improve more accurate information.

BRIEF SUMMARY

The present embodiments may, inter alia, manage operation of connected devices and items in response to certain conditions and commands. Further, the present embodiments may effectively and efficiently communicate relevant information associated with connected devices and items. Additionally, the present embodiments may facilitate insurance processing associated with the connected devices and items based upon data received from the connected devices and items, among other functionalities. One particular functionality relates to facilitating certain device operations in response to detecting, from image data, certain occupants of a property.

Generally, the present embodiments may relate to (1) home control and/or automation, as well as (2) loss prevention, reduction, and/or mitigation through proactively managing device operation based upon image data, and/or notifying an individual of device operation. The foregoing functionality may also be used by an insurance provider to generate, update, or adjust insurance policies, premiums, rates, discounts, points, and/or rewards, and/or make recommendations to an insured individual.

According to one embodiment, a computer-implemented method of controlling a plurality of devices associated with a property may be provided. The property may be populated with a hardware controller in communication with a plurality of devices. The method may include, with customer permission or affirmative consent, (1) receiving, by the hardware controller via a communication network, image data from a set of image sensors associated with the property; (2) accessing, from memory, at least one occupant profile containing data associated with at least one occupant of the property; (3) comparing, by a processor, the image data to the data contained in the at least one occupant profile to determine that the at least one occupant is present on the property; (4) based upon the data contained in the at least one occupant profile: (i) determining an action to be performed, and (ii) identifying at least one of the plurality of devices to perform the action; and/or (5) directing the at least one of the plurality of devices to perform the action to facilitate providing occupant-location based functionality or services, and/or directing device operation based upon occupant location and/or presence at the property. The method may include additional, less, or alternate actions, including those discussed elsewhere herein, and/or may be implemented via one or more local or remote processors or wireless communication networks, and/or via computer-executable instructions stored on non-transitory computer-readable medium or media.

According to another embodiment, a hardware controller for controlling a plurality of devices associated with a property may be provided. The hardware controller may be in communication with a plurality of devices. The hardware controller may include at least one transceiver configured to receive image data from a set of image sensors associated with the property, a memory adapted to store non-transitory computer executable instructions and a set of occupant profiles, and a processor configured to interface with the at least one transceiver and the memory. The processor may be configured to execute the non-transitory computer executable instructions to cause the processor to, with customer permission, (1) access, from the memory, at least one occupant profile of the set of occupant profiles, the at least one occupant profile containing data associated with at least one occupant of the property, (2) compare the image data to the data contained in the at least one occupant profile to determine that the at least one occupant is present on the property, (3) based upon the data contained in the at least one occupant profile: (i) determine an action to be performed, and (ii) identify at least one of the plurality of devices to perform the action, and/or (4) direct the at least one of the plurality of devices to perform the action to facilitate providing occupant-location based functionality or services, and/or directing device operation based upon occupant location and/or presence. The hardware controller and/or associated processor may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each Figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1:
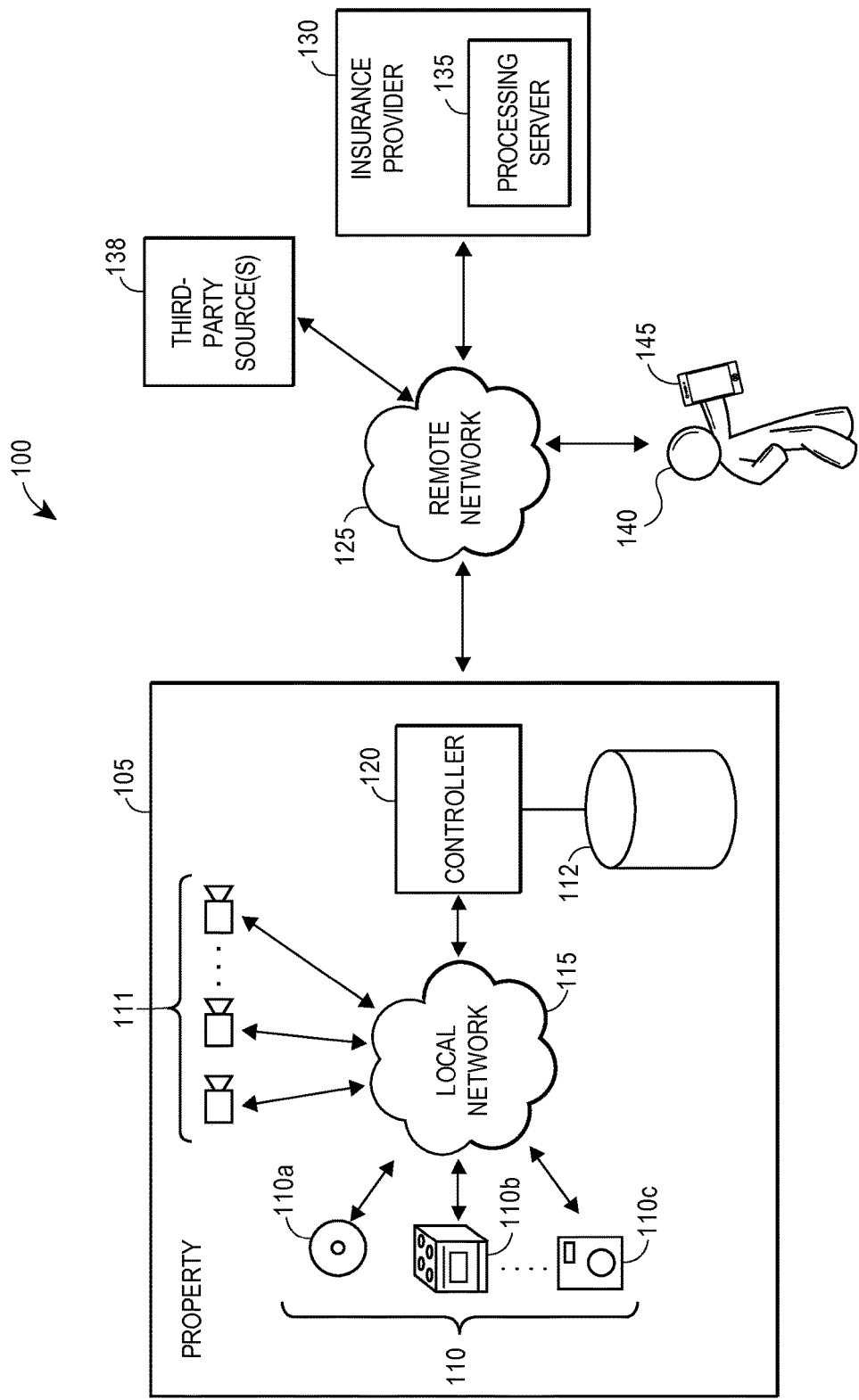
FIG. 1 depicts an exemplary environment including components and entities associated with analyzing data, managing device operation, and facilitating insurance policy processing, in accordance with some embodiments.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, managing operation of devices or personal property within a home or other type of property, such as household furniture, appliances, electronics, vehicles (e.g., cars, boats, motorcycles), and/or other personal belongings (e.g., clothing, jewelry, antiques). Generally, a home or property may have a "smart" central controller that may be wirelessly connected, or connected via hard-wire, with various household related items, devices, and/or sensors. The central controller may be associated with any type of property, such as homes, office buildings, restaurants, farms, and/or other types of properties.

The central controller, and/or one or more remote processors or servers associated with an insurance provider, may be in wireless or wired communication with various "smart" items or devices, such as smart appliances (e.g., clothes washer, dryer, dish washer, refrigerator, etc.); smart heating devices (e.g., furnace, space heater, etc.); smart cooling devices (e.g., air conditioning units, fans, ceiling fans, etc.); smart plumbing fixtures (e.g., toilets, showers, water heaters, piping, interior and yard sprinklers, etc.); smart cooking devices (e.g., stoves, ovens, grills, microwaves, etc.); smart wiring, lighting, and lamps; smart personal vehicles; smart thermostats; smart windows, doors, or garage doors; smart window blinds or shutters; and/or other smart devices and/or sensors capable of wireless or wired communication. Each smart device (or sensor associated therewith), as well as the central controller and/or insurance provider remote processor(s), may be equipped with a processor, memory unit, software applications, wireless transceivers, local power supply, various types of sensors, and/or other components.

The central controller, and/or remote processor(s) of the insurance provider, may collect or retrieve various data from the devices or personal property, analyze the data, and/or identify various actions to facilitate based upon the analysis. In particular, the central controller and/or insurance provider remote processor(s) may retrieve image data from one or more image sensors populated within a property, where the image data may depict one or more individuals. The central controller and/or insurance provider remote processor(s) may analyze the image data by comparing the image data to stored profile data associated with a set of occupants or individuals that are associated with the property.

Based upon the analysis, the central controller and/or insurance provider remote processor(s) may identify one or more of the occupants who are depicted in the image data. The central controller and/or insurance provider remote processor(s) may determine, based upon the image data and/or the identified occupant(s), an action(s) to perform and a smart device(s) to perform the action, and may direct the smart device(s) to perform the action(s). The central controller and/or insurance provider remote processor(s) may also process an account of the individual according to the determined action(s), such as an insurance policy of the individual, and/or may generate and communicate a notification indicating the determined action(s).

The systems and methods discussed herein address a challenge that is particular to property management. In particular, the challenge relates to a difficulty in controlling various devices within a property based upon the presence of certain individuals within the property. This is particularly apparent when certain individuals may have certain preferences for certain device actions. In conventional systems, devices may perform certain actions in response to an explicit command or request, which necessitates the command or request to be explicitly determined or identified. Further, conventional systems do not automatically identify individuals. In contrast, the systems and methods dynamically identify actions for smart devices to perform in response to an analysis of image data. Therefore, because the systems and methods employ the collection and analysis of image data to determine and generate actions to be performed by connected devices within a property, the systems and methods are necessarily rooted in computer technology in order to overcome the noted shortcomings that specifically arise in the realm of property management.

Similarly, the systems and methods provide improvements in a technical field, namely, home automation. Instead of the systems and methods merely being performed by hardware components using basic functions, the systems and methods employ complex steps that go beyond the mere concept of simply retrieving and combining data using a computer. In particular, the hardware components connected to image sensors, receive image data from the image sensors, analyze the image data in combination with various additional data to determine actions to perform, and facilitate the actions to manage operation of certain devices. Additionally, because a central controller in a property communicates with image sensors are connected devices with the property, the central controller, the image sensors, and the connected devices are part of a "thin client" environment that improves data persistence and information processing. This combination of elements further impose meaningful limits in that the operations are applied to improve home automation by detecting when certain actions need to be initiated, and facilitating the actions in a meaningful and effective way.

According to implementations, the systems and methods may support a dynamic, real-time or near-real-time analysis of any received image data. In particular, the central controller and/or insurance provider may retrieve and/or receive real-time image data from the image sensors, analyze the image data in real time, and dynamically determine an action or command to take based upon the analysis. Additionally, the central controller and/or insurance provider may provide, in real-time, the action or command to the smart device (and/or to another device) to perform the command to manage its operation. Accordingly, the real-time capability of the systems and methods enable the smart devices to dynamically modify their operation to manage the presence of certain individuals that are identified from the analysis of the image data. Additionally, individuals associated with the property are afforded the benefit of being dynamically notified of any completed or taken actions so that the individuals may take any proper mitigating actions.

Generally, the systems and methods offer numerous benefits to operation of devices within the property, as well as to individuals associated with the property. In particular, the systems and methods may automatically detect occupants that are present on the premises of a property, and may automatically facilitate certain actions based upon the location of the occupants, preferences of the occupants, and/or other factors. As a result, benefits associated with control of certain devices may be effectively and automatically realized. Further, the systems and methods improve loss prevention and mitigate actual loss. As a further benefit, individuals associated with the property may be able to program or dictate which actions are to be performed in response to certain conditions being met.

The systems and methods may further offer a benefit to insurance providers and customers thereof. Particularly, the present embodiments may facilitate (a) providing and updating insurance policies; (b) the handling or adjusting of homm insurance claims; (c) the disbursement of monies related to insurance claims; (d) modifying insurance coverage amounts; (e) updating and improving damage estimate models; and/or (f) other insurance-related activities. The systems and methods may further offer a benefit to customers by offering improved insurance claim processing. Further, the insurance providers may stand out as a cost-effective insurance provider, thereby retaining existing customers and attracting new customers. It should be appreciated that further benefits to the systems and methods are envisioned.

The method may also include adjusting an insurance policy, premium, or discount (such as a homeowners, renters, auto, home, health, personal articles, pet, burial, or life insurance policy, premium, or discount) based upon the functionality discussed herein, and/or an insured having a home and/or mobile device with such functionality.

I. Exemplary Environment and Components for Assessing Device Operation and Functionalities Relating Thereto FIG. 1 depicts an exemplary environment 100 including components and entities for managing devices associated with a property and processing insurance policies associated therewith. Although FIG. 1 depicts certain entities, components, and devices, it should be appreciated that additional, fewer, or alternate entities and components are envisioned.

As illustrated in FIG. 1, the environment 100 may include a property 105 that contains a controller 120 and a plurality of devices 110 (or smart devices) that may be each connected to a local communication network 115. Each of the plurality of devices 110 may be a "smart" device that may be configured with one or more sensors capable of sensing and communicating operating data associated with the corresponding device 110. As shown in FIG. 1, the plurality of devices 110 may include a smart alarm system 110a, a smart stove 110b, and/or a smart washing machine 110c. Each of the plurality of devices 110 may be located within or proximate to the property 105 (generally, "on premises"). Although FIG. 1 depicts only one property 105, it should be appreciated that multiple properties are envisioned, each with its own controller and devices. Further, it should be appreciated that additional, fewer, or alternate devices may be present in the property 105.

In some cases, the plurality of devices 110 may be purchased from a manufacturer with the "smart" functionally incorporated therein. In other cases, the plurality of devices 110 may have been purchased as "dumb" devices and subsequently modified to add the "smart" functionality to the device. For instance, a homeowner may purchase an alarm system that installs sensors on or near a door to detect when a door has been opened and/or unlocked.

In some embodiments, the plurality of devices 110 may monitor their own status or condition via the sensors to detect any issues or problems. In response to detecting issues or problems, the plurality of devices 110 may be able to indicate the issues or problems via display components, such as LED lights, display screens, or other visual indicators. In further embodiments, the controller 120 may be configured to monitor, via sensor data, whether the plurality of devices 110 and/or parts thereof have been installed correctly, whether replacement parts are new and/or otherwise in good condition, and/or other conditions associated with the plurality of devices 110 and/or parts thereof.

The plurality of devices 110 may be configured to communicate with a controller 120 via the local communication network 115. The local communication network 115 may facilitate any type of data communication between devices and controllers located on or proximate to the property 105 via any standard or technology (e.g., LAN, WLAN, any IEEE 802 standard including Ethernet, and/or others). The local communication network 115 may further support various short-range communication protocols, such as Bluetooth®, Bluetooth® Low Energy, near field communication (NFC), radio-frequency identification (RFID), and/or other types of short-range protocols.

According to aspects, the plurality of devices 110 may transmit, to the controller 120 via the local communication network 115 (and/or to the insurance provider 130 remote processing server 135 via the network 125), operational data gathered from sensors associated with the plurality of devices 110. The operational data may be audio data, image or video data, status data, usage amounts, and/or other data or information. For instance, the operational data may indicate that a window has been shattered; the presence of a person, fire, or water in a room; the sound made near a smart device; and/or other information pertinent to an operation state or status of the plurality of devices 110. For further instance, the operational data may include motion data that may indicate whether any individuals are within the property 105 (i.e., whether the property 105 is occupied or unoccupied). Additionally, the operational data may include device usage data. The operational data may include a timestamp representing the time that the operational data was recorded.

In some cases, the plurality of devices 110 may transmit, to the controller 120 (and/or insurance provider 130 remote processing server 135), various data and information associated with the plurality of devices 110. In particular, the data and information may include location data within the property, as well as various costs and prices associated with the plurality of devices 110. For instance, a washing machine may include a component such as a data tag that stores a location of the washing machine within the property 105, a retail price of the washing machine, and/or replacement costs of various parts of (or the entirety of) the washing machine. The various data and information may be programmable and updatable by an individual or automatically by the controller 120.

In some implementations, there may be one or more dedicated image sensors 111 that may be disposed or otherwise located throughout the property 105. The image sensor(s) 111 may be configured to capture multimedia data (e.g., audio data, image or video data) and send the captured data to the controller 120 via the local network 115. It should be appreciated that the image sensor(s) 111 may be stand-alone image sensors or may be included as sensors within one or more of the plurality of devices 110. Each of the image sensors 111 may also have an associated location within the property 105, and may be configured to communicate this location to the controller 120 via the local network 115. In some implementations, the controller 120 may store the locations of the image sensors 111.

The controller 120 may be coupled to a database 112 that stores various operational data, occupant profile data, and information associated with the plurality of devices 110 and the image sensors 111. Although FIG. 1 depicts the database 112 as coupled to the controller 120, it is envisioned that the database 112 may be maintained in the "cloud" such that any element of the environment 100 capable of communicating over either the local network 115 or one or more other networks 125 may directly interact with the database 112.

In some embodiments, the database 112 may organize the operational data according to which individual device 110 the data may be associated and/or the room or subsection of the property in which the data was recorded. Further, the database 112 may maintain an inventory list that includes the plurality of devices 110, as well as various data and information associated with the plurality of devices 110 (e.g., locations, replacement costs, etc.).

In one embodiment, the database 112 may maintain various operation states of the plurality of devices 110. In particular, the operation states may specify various settings of the plurality of devices 110 such that when the respective device is configured at the setting(s), the respective device will operate in the corresponding operation state. For instance, an operation state for a smart thermostat may be "heat conservation" whereby the corresponding setting is 64 degrees (as opposed to a more "normal" 70 degree setting). It should be appreciated that each operation state may specify settings for more than one of the devices 110.

The database 112 may further store a set of user profiles that correspond to a set of individuals that may be associated with the property 105, where the set of individuals may be a set of occupants of the property 105. Each of the set of user profiles may store data related to the physical appearance or physical traits of the corresponding individual. For example, a user profile may store facial recognition data, approximate dimensions of the individual (e.g., height and weight), hair color, eye color, build (e.g., slender, athletic), and/or the like. Each of the set of user profiles may further store a set of preferences for the corresponding individuals. In some implementations, at least a portion of the set of preferences may be set by the corresponding individual or may be automatically determined/identified by the controller 120, such as if the set of preferences are a default set of preferences.

The set of preferences may correspond to certain actions that an individual may desire to be performed by the one or more of the plurality of devices 110 when the individual is in a specific location or otherwise in a certain situation within the property 105. For example, one of the set of preferences for an individual may specify to automatically illuminate a set of kitchen lights when the individual enters a garage of the property 105. For further example, another of the set of preferences for the individual may specify to automatically open a smart door when the individual is detected on a front porch of the property 105.

The controller 120 (and/or the plurality of devices 112) may be configured to communicate with other components and entities, such as an insurance provider 130 and various third party source(s) 138 via the network(s) 125. According to some embodiments, the network(s) 125 may facilitate any data communication between the controller 120 located on the property 105 and entities or individuals remote to the property 105 via any standard or technology (e.g., GSM, CDMA, TDMA, WCDMA, LTE, EDGE, OFDM, GPRS, EV-DO, UWB, IEEE 802 including Ethernet, WiMAX, Wi-Fi, and/or others). In some cases, both the local network 115 and the network 125(s) may utilize the same technology.

Generally, the insurance provider 130 may be any individual, group of individuals, company, corporation, or other type of entity that may issue insurance policies for customers, such as a home insurance policy associated with the property 105. According to the present embodiments, the insurance provider 130 may include one or more processing server(s) 135 configured to facilitate the functionalities as discussed herein. Although FIG. 1 depicts the processing server 135 as a part of the insurance provider 130, it should be appreciated that the processing server 135 may be separate from (and connected to or accessible by) the insurance provider 130.

Further, although the present disclosure describes the systems and methods as being facilitated in part by the insurance provider 130, it should be appreciated that other non-insurance related entities may implement the systems and methods. For instance, a general contractor may aggregate the insurance-risk data across many properties to determine which appliances or products provide the best protection against specific causes of loss, and/or deploy the appliances or products based upon where causes of loss are most likely to occur. Accordingly, it may not be necessary for the property 105 to have an associated insurance policy for the property owners to enjoy the benefits of the systems and methods.

The third-party source(s) 138 may represent any entity or component that is configured to obtain, detect, and/or determine data or information that may be relevant to the devices 110 of the property 105. In some embodiments, the third-party source(s) 138 may be a manufacturer, supplier, servicer, or retailer of the any of the devices 110, as well as for replacement devices for the devices 110. For instance, if one of the devices 110 is a refrigerator, the third-party source 138 may be refrigerator manufacturer that sells refrigerators of the same or different types or models as the refrigerator device 110. The third-party source(s) 138 may store data associated with a replacement device (e.g., cost, retail location, general information, availability, or the like). The third-party source(s) 138 may be configured to communicate various data or information to the controller 120 and/or to the insurance provider 130 via the network(s) 125, whereby the controller 120 and/or the insurance provider 130 may examine the data or information to facilitate various functionalities.

The controller 120, the insurance provider 130, and/or the processing server 135, and the third-party source(s) 138 may also be in communication, via the network(s) 125, with an electronic device 145 associated with an individual 140. In some embodiments, the individual 140 may have an insurance policy (e.g., a home insurance policy) for the property 105 or a portion of the property 105, or may otherwise be associated with the property 105 (e.g., the individual 140 may live in the property 105). The electronic device 145 may be a mobile device, such as a smartphone, a desktop computer, a laptop, a tablet, a phablet, a smart watch, smart glasses, wearable electronics, pager, personal digital assistant, or any other electronic device, including computing devices configured for wireless radio frequency (RF) communication and data transmission. In some implementations, the controller 120 (and/or insurance provider 130 remote processing server 135) may communicate, to the individual 140 via the electronic device 145, an indication of the operation of the plurality of devices 110, such as the commands transmitted to the plurality of devices 110. Further, the controller 120 (and/or insurance provider 130 remote processing server 135) may enable the individual 140 to remotely control various of the plurality of devices 110 via the electronic device 145.

According to some other implementations, the controller 120 (and/or insurance provider 130 remote processing server 135) may detect damage to any of the plurality of devices 110 and/or to other portions of the property 105. The controller 120 (and/or insurance provider 130 remote processing server 135) may generate notifications or alerts associated with the detected damage, and/or communicate the notifications or alerts to the electronic device 145 via the network 125. Further, the controller 120 (and/or insurance provider 130 remote processing server 135) may also generate a proposed insurance claim that indicates the damage and transmit, via the network 125, the proposed insurance claim related to the electronic device 145. The proposed insurance claim may contain pre-populated fields that indicate various information and data, such as causes of loss (e.g., water, wind, fire, etc.); damaged devices; costs associated with the damaged devices; time, date, and/or location of the insurance-related event; and/or other information included in an insurance claim.

The controller 120 (and/or insurance provider 130 remote processing server 135) may also transmit any modifications to insurance policies based upon detected data from the plurality of devices 110. In response, the homeowner 140 may accept the proposed insurance claim or make modifications to the proposed insurance claim, and/or otherwise accept/reject any modifications to the insurance policy. The electronic device may transmit, via the network 125, the accepted or modified insurance claim back to the controller 120 (and/or insurance provider 130 remote processing server 135).

The controller 120 may facilitate any processing of the insurance claim with the processing server 135 of the insurance provider 130. Additionally or alternatively, the processing server 135 may facilitate the proposed insurance claim communications and processing directly with the customer 140. In some implementations, the insurance provider 130 remote processing server 135 may provide the same functionality as that described herein with respect to the controller 120.

The controller 120, and/or the insurance provider 130 remote processing server 135, may also assess usage of various of the devices 110, and/or may notify individuals of potential concerns, lack of usage, and/or other information. In particular, the controller 120, and/or the insurance provider 130 remote processing server 135, may gather various data from the devices 110, and determine that there may be an issue or concern with one or more of the devices 110. The issue or concern may have a risk of, in some circumstances, leading to a loss or damage to the property 105, or breakdown or malfunctioning of the corresponding device 110. The insurance provider 130 remote processing server 135, may generate a corresponding alert or notification, and send the alert or notification to the individual, such as via wireless communication to their mobile device.

Figure 2:
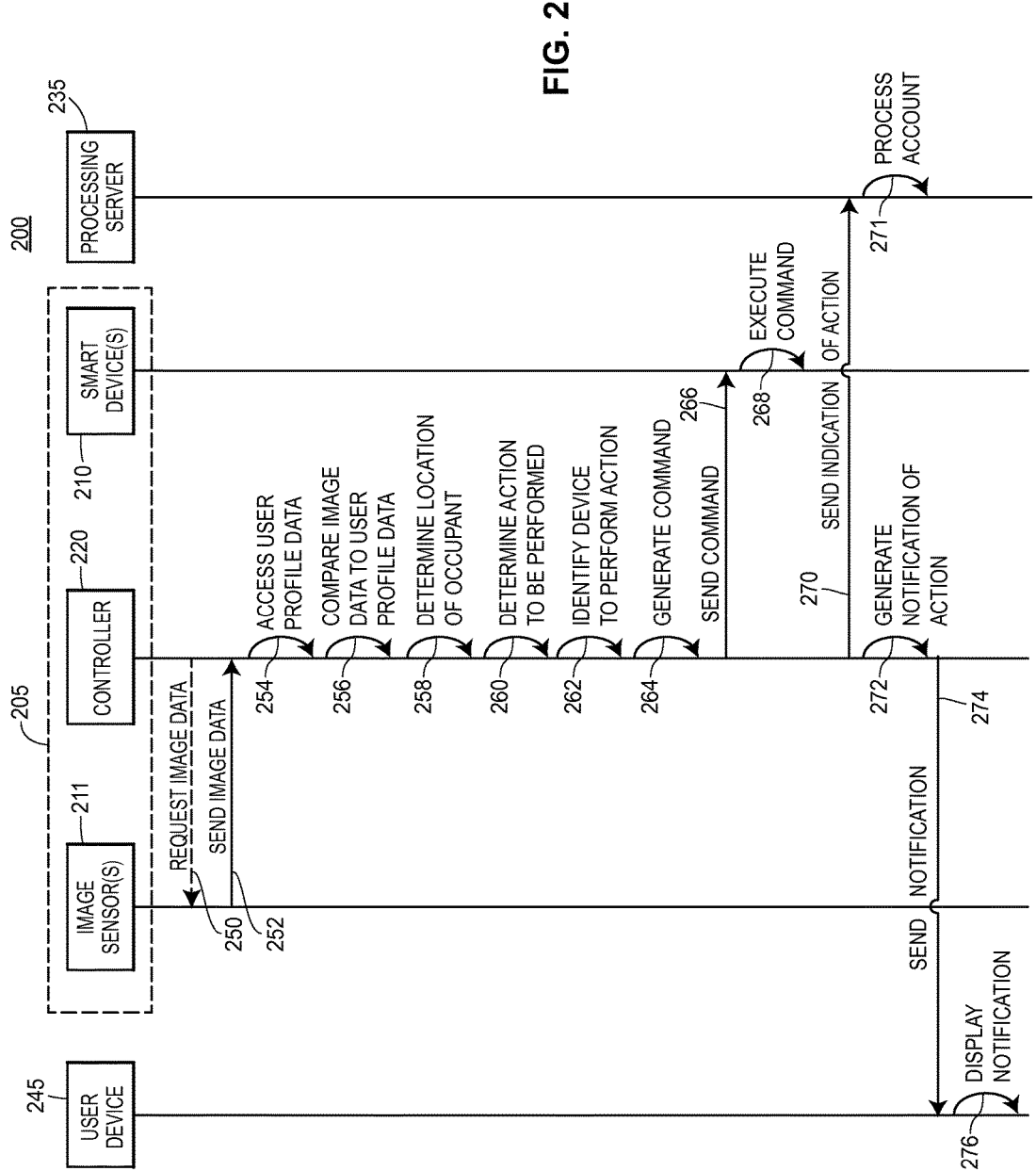
FIG. 2 is an exemplary signal diagram associated with analyzing image data and managing device operation related thereto, in accordance with some embodiments.

II. Exemplary Communication Flow for Analyzing Image Data and Facilitating Various Actions Related Thereto Referring to FIG. 2, illustrated is an exemplary signal diagram 200 associated with collecting image data and facilitating various device functionalities corresponding thereto. FIG. 2 may include one or more smart devices 210 (such as one or more of the smart devices 110 (or one of the plurality of devices) as discussed with respect to FIG. 1), a controller 220 (such as the controller 120 as discussed with respect to FIG. 1), a processing server 235 (such as the processing server 135 as discussed with respect to FIG. 1), one or more image sensors 211 (such as the image sensor(s)

111 as discussed with respect to FIG. 1), and/or a user device 245 (such as the user device 145 as discussed with respect to FIG. 1).

The smart device(s) 210, the image sensor(s) 211, and the controller 220 may be located within a property 205 (such as the property 105 as discussed with respect to FIG. 1). Further, in some implementations, one or more of the image sensor(s) 211 may be included as part of one or more of the smart device(s) 210. According to some embodiments, the user device 245 may belong to an individual associated with the property 205, such as a resident or occupant of the property 205 and/or an individual having an insurance policy for the property 205. Further, the image sensor(s) 211 may be disposed or located throughout various portions or locations of the property 205. In particular, the image sensor(s) 211 may be disposed or located in proximity to portions or locations of the property 205 where occupants may occasionally or frequently traverse. For example, the image sensor(s) 211 may be located in a hallway, near an entrance to the property 205, and/or in the kitchen.

The signal diagram 200 may begin when the controller 220 optionally requests (250) image data from the image sensor(s) 211 via a network connection within the property 205. The request may specify various parameters, such as a particular time period (e.g., the last hour, the last minute, real-time image data), and/or may request timestamp(s) associated with the image data. The image sensor(s) 211 may capture digital image data and send (252) the captured image data to the controller 220. The image data may be in the form of digital images, digital videos, and/or a combination thereof. An audio module (e.g., a microphone) associated with the image sensor(s) 211 may capture corresponding audio data and may send the audio data to the controller 220. The image sensor(s) 211 may send the digital image data to the controller 220 in real-time as the digital image data is captured, and/or may send the digital image data to the controller 220 in response to a trigger. In one scenario, the trigger may be a request from the controller 220. In another scenario, the image sensor(s) 211 may be equipped with a motion sensor, and the image sensor(s) 211 may capture and send image data in response to the motion sensor detecting movement (e.g., an occupant approaching an entrance to the property 205).

The controller 220 may access (254) user profile data that may be stored locally or may be retrieved from a remote server or data source. According to embodiments, the user profile data may correspond to a set of individuals associated with the property 205, such as a set of occupants of the property 205, whereby each individual may have an associated user profile. The user profile may include attributes or parameters associated with the corresponding individual/occupant including, but not limited to, physical attributes such as height, weight, hair color, eye color, body type, and/or the like; and/or stored facial recognition data. In some scenarios, the user profile data may be associated with occupants who are explicitly registered with the property 205.

The user profile data may further include a set of preferences that may be set by the corresponding individual/occupant and/or may be default preferences, where the set of preferences may relate to the operation of one or more of the smart device(s) 210. The set of preferences may also have a corresponding trigger event or condition. For example, one of the preferences may specify that if a particular occupant is detected near the front entrance to the property 205, then the occupant prefers that the front door automatically open, and that the hallway lights automatically activate. Accordingly, the set of preferences may indicate a certain location of the property that may be associated with one or more of the image sensors 211 and/or with one or more of the smart devices 210.

The controller 220 may compare (256) the received image data to the user profile data to identify an occupant or individual who may be depicted in the image data. In some implementations, the controller 220 may apply a facial recognition algorithm or technique to the received image data and compare any resulting data to any facial recognition data included in the user profile data to identify a particular occupant. Further, in some implementations, the controller 220 may extract any physical attribute data from the received image data and compare the extracted data to any physical attribute data included in the set of preferences. In analyzing the received image data, the controller 220 may identify any additional, auxiliary items that may be depicted in the image data, where the additional, auxiliary items may be associated with any occupant(s) depicted in the image data. For example, the image data may indicate that an occupant is approaching a front entrance to the property 205 carrying grocery bags or pushing a stroller.

The controller 220 may also determine (258) a location of the occupant in relation to the property 205. In particular, the controller 220 may determine the location by identifying a location of the image sensor 211 that sent the image data that depicts the occupant. The controller 220 may also refine the location of the occupant by accounting for image data from multiple of the image sensors 211. The controller 220 may also determine (260) an action to be performed based upon the set of preferences of the occupant, the location determined in (258), and/or other contextual data (e.g., a time of day, day of week, time of year, etc.). As discussed above, the controller 220 may determine the action to be performed from the set of preferences, the location, and/or other contextual data based upon a trigger condition, such as the occupant being at a particular location at a particular time. It should be appreciated that the controller 220 may determine multiple actions to be performed based upon the analysis, such as multiple actions in a single sequence of actions.

After determining the action to be performed, the controller 220 may identify (262) one or more of the smart devices 210 to perform the action. In some implementations, the set of preferences of the user profile may specify or indicate the one or more of the smart devices 210 to perform the action. In other implementations, the controller 220 may dynamically determine which of the one or more of the smart devices 210 to perform the action. For example, if the set of preferences indicates that a certain occupant prefers to have a lit pathway near a front entrance of the property 205, then the controller 220 may dynamically identify a set of hallway lights near the front entrance to activate when the occupant is detected at the front entrance of the property (i.e., the occupant may be depicted in image data that is captured by one or more image sensors located near the front entrance).

The controller 220 may generate (264) a command according to the determined action and the identified smart device 210 to perform the action. Further, the controller 220 may send (266) the command to the appropriate smart device 210. After receiving the command, the appropriate smart device 210 may execute (268) the command. By executing the command, the smart device 210 may cause or initiate the action determined in (260). For example, if the action is related to automatically opening the front door of the property 205, then a smart door may execute the command to cause the smart door to open. It should be appreciated that, for a single determined action, the controller 220 may generate multiple different commands, and may send the different commands to multiple of the smart devices 210 for execution thereon.

The controller 220 may facilitate various processing associated with the determined action and the control of the smart device(s) 210. In one implementation, there may be a modification to an insurance policy that is needed based upon the control of the smart device(s) 210. For example, by controlling certain actions that generally increase the security of the property 205, a property insurance policyholder may be eligible for a premium reduction. Accordingly, the controller 220 may send (270) an indication of the action to the processing server 235. After receiving the indication of the action, the processing server 235 may accordingly process (271) an account of an individual associated with the property 205. In particular, the processing server 235 may facilitate any adjustments or recordations that may be associated with the determined action and/or the command executed by the smart device(s) 210.

The controller 220 may further generate (272) a notification that indicates the action. In some scenarios, an individual (who may or may not be the occupant identified in (256)) may request to be notified of certain performed actions. The controller 220 may send (274) the notification to the user device 245. After receiving the notification, the user device 245 may display (276) the notification. Accordingly, the individual may use the user device 245 to effectively and efficiently assess what actions have been facilitated within the property 205. It should be appreciated that the individual may or not be present within the property 205 when the user device 245 receives the notification. In some implementations, the individual may interface with the user device 245 to command the controller 220 to perform certain actions or controls (such as any actions or controls that may be performed by the smart device(s) 210)).

Although FIG. 2 depicts the controller 220 performing various steps and determinations, it should be appreciated that the processing server 235 may perform the same or similar steps or determinations. For example, the processing server 235 may receive and analyze image data, determine actions for smart devices to perform, generate commands for the actions and communicate the commands to the smart devices, and communicate any notifications.

III. Exemplary Method for Controlling Devices Associated with a Property

Figure 3:
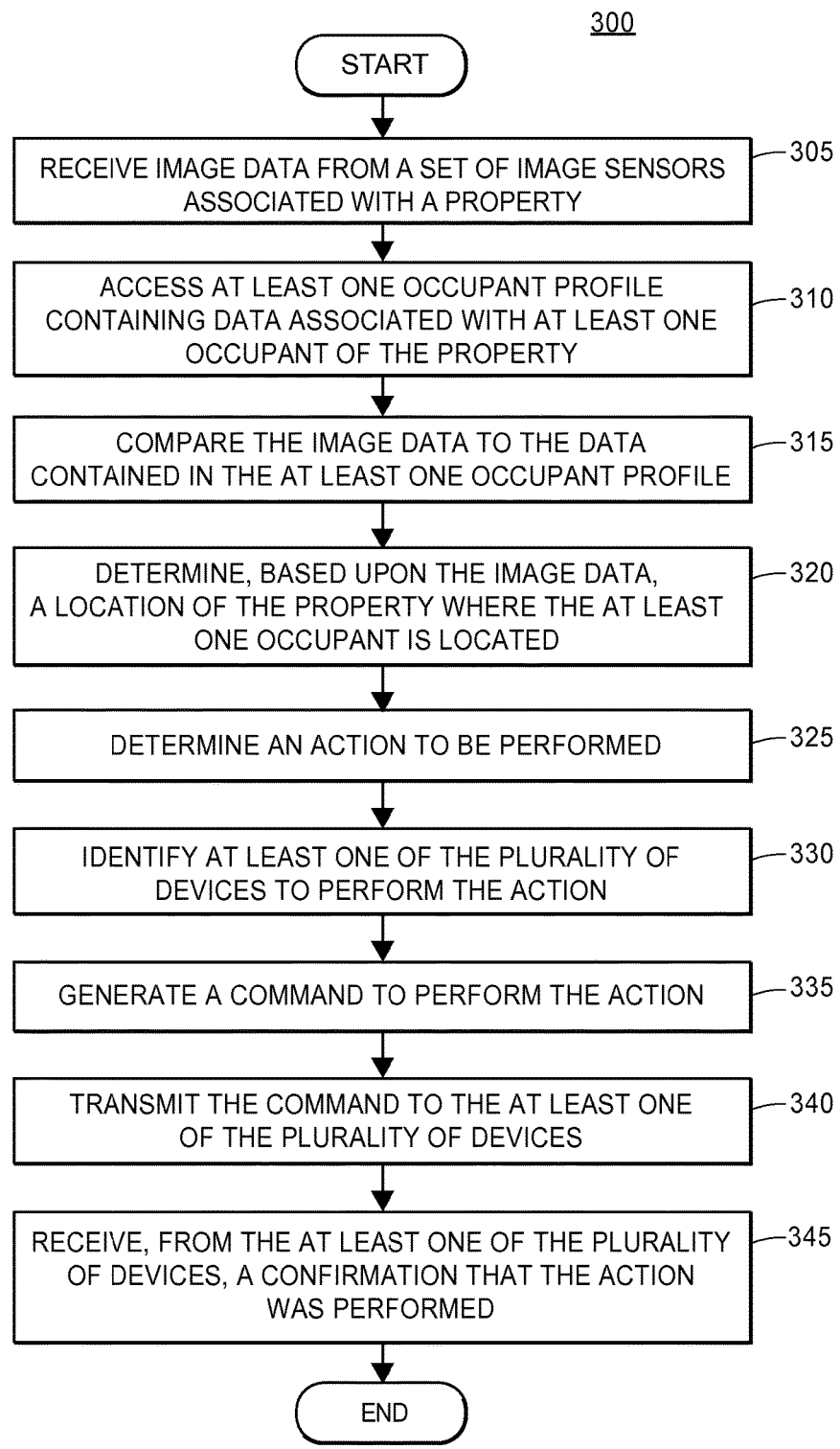
FIG. 3 is a flow diagram of an exemplary computer-implemented method of controlling a plurality of devices associated with a property, in accordance with some embodiments.

Referring to FIG. 3, depicted is a block diagram of an exemplary method 300 of controlling one or more devices within a property. The method 300 may be facilitated by an electronic device within the property such as the controller 120, that may be in direct or indirect communication with a remote server (such as the insurance provider 130 or a remote processor or server thereof), one or more smart devices, one or more image sensors, and/or a client device. In some implementations, the method 300 may be facilitated by a remote entity such as an insurance provider (such as the insurance provider 130).

The method 300 may begin when the controller receives (block 305) image data from a set of image sensors associated with a property. According to embodiments, the set of image sensors may be disposed or located at different locations within the property. Further, the controller may receive the image data from one or more of the set of image sensors in real time as the one or more image sensors collect the image data, where the controller may also explicitly request the image data from the one or more of the set of image sensors.

The controller may access (block 310) at least one occupant profile containing data associated with at least one occupant of the property. In one implementation, the at least one occupant profile may include a set of images corresponding to a set of occupants that may be associated with the property, a set of physical attributes corresponding to the set of occupants, and/or relevant facial recognition data associated with the set of occupants. In this regard, the at least one occupant profile may visually indicate the set of occupants. The at least one occupant profile may further include a set of preferences that respectively correspond to the set of occupants, where the set of preferences may be associated with desired operation of the one or more devices of the property (i.e., actions for the devices to take).

The controller may compare (block 315) the image data to the data contained in the at least one occupant profile. In one embodiment, the controller may analyze the image data to detect an individual and a set of characteristics of the individual, and compare the set of characteristics of the individual to the set of physical attributes of the at least one occupant to determine that the at least one occupant is depicted in the image data. Further, in another embodiment, the controller may perform a facial recognition technique on the image data and the data contained in the at least one occupant profile to determine that the at least one occupant is depicted in the image data.

The controller may also determine (block 320), based upon the image data, a location of the property where the at least one occupant is located. In particular, the controller may identify a location of the image sensor from which the image data is received, and may deem the location of the occupant to be at or near the location of the image sensor. The controller may determine (block 325) an action to be performed. In particular, the controller may determine the action at least in part according to a set of preferences contained in the at least one occupant profile. In some implementations, the controller may determine a default action to perform based upon the detection of the occupant at the determined location.

The controller may identify (block 330) at least one of the plurality of devices to perform the action. In particular, the controller may identify the at least one of the plurality of devices that is capable of performing the action to comply with the set of preferences of the at least one occupant. Accordingly, the controller may generate (block 335) a command to perform the action. The command may be in the form of a set of computer-executable instructions that may be executed by the intended device. It should be appreciated that in some scenarios, the controller may generate multiple commands that may be intended for multiple of the plurality of devices.

The controller may transmit (block 340) the command to the at least one of the plurality of devices. In particular, the controller may transmit the command to the at least one of the plurality of devices via a network connection, where the at least one of the plurality of devices may execute the command to effectively perform the action. In some scenarios, multiple of the plurality of devices may each execute a distinct command received from the controller. The controller may receive (block 345), from the at least one of the plurality of devices, a confirmation that the action was performed. In some implementations, the controller may also generate a notification of the action and communicate the notification to a relevant individual associated with the property.

IV. Exemplary Controller

Figure 4:
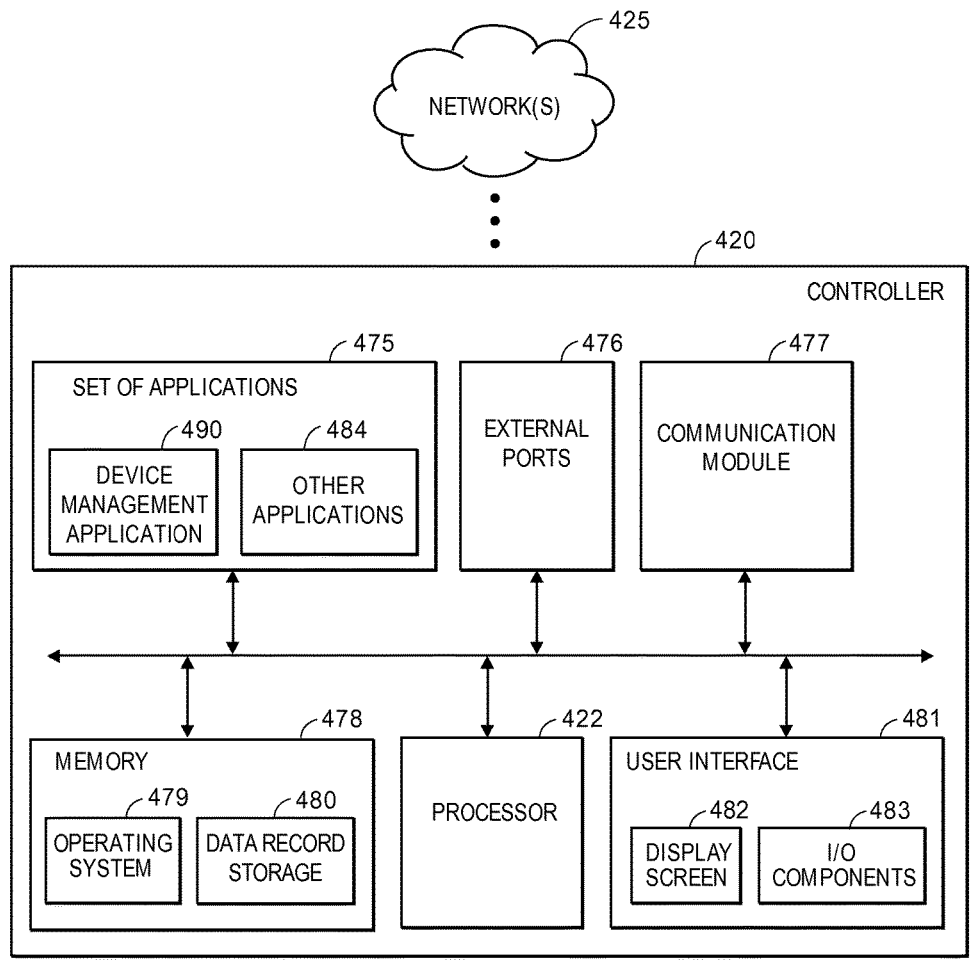
FIG. 4 is a block diagram of an exemplary controller in accordance with some embodiments.

FIG. 4 illustrates a diagram of an exemplary controller 420 (such as the controller 120 discussed with respect to FIG. 1) in which the functionalities as discussed herein may be implemented. It should be appreciated that the controller 420 may be associated with a property, as discussed herein.

The controller 420 may include a processor 422, as well as a memory 478. The memory 478 may store an operating system 479 capable of facilitating the functionalities as discussed herein, as well as a set of applications 475 (i.e., machine readable instructions). For instance, one of the set of applications 475 may be a policy processing application 484 configured to access and process customer insurance policies, and another of the set of applications 475 may be a device management application 490 configured to analyze image data and manage operation of smart devices accordingly. It should be appreciated that other applications are envisioned.

The processor 422 may interface with the memory 478 to execute the operating system 479 and the set of applications 475. According to some embodiments, the memory 478 may also include a data record storage 480 that stores various data and information associated with devices, occupants, and/or insurance policies. The policy processing application 484 and the device management application 490 may interface with the data record storage 480 to retrieve relevant information that the policy processing application 484 and the device management application 490 may use to manage insurance policies, generate proposed insurance claims, generate executable commands, generate notifications, and/or perform other functionalities. For example, in analyzing received image data, the device management application 490 may retrieve occupant profile data from the data record storage 480. The memory 478 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The controller 420 may further include a communication module 477 configured to communicate data via one or more networks 425. According to some embodiments, the communication module 477 may include one or more transceivers (e.g., WWAN, WLAN, and/or WPAN transceivers) functioning in accordance with IEEE standards, 3GPP standards, or other standards, and/or configured to receive and transmit data via one or more external ports 476. Further, the communication module 477 may include a short-range network component (e.g., an RFID reader) configured for short-range network communications. For instance, the communication module 477 may receive, via the network 425, usage data from a plurality of devices populated within a property.

The controller 420 may further include a user interface 481 configured to present information to a user and/or receive inputs from the user. As shown in FIG. 4, the user interface 481 may include a display screen 482 and I/O components 483 (e.g., ports, capacitive or resistive touch sensitive input panels, keys, buttons, lights, LEDs, speakers, microphones). According to some embodiments, the user may access the controller 420 via the user interface 481 to occupant profile data that may include a set of preferences for actions to be performed. In some implementations, the controller 420 may be configured to perform insurance-related functions, such as generating proposed insurance claims and facilitating insurance claim processing. In some embodiments, the controller 420 may perform the functionalities as discussed herein as part of a "cloud" network or may otherwise communicate with other hardware or software components within the cloud to send, retrieve, and/or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 422 (e.g., working in connection with the operating system 479) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

V. Exemplary Server

Figure 5:
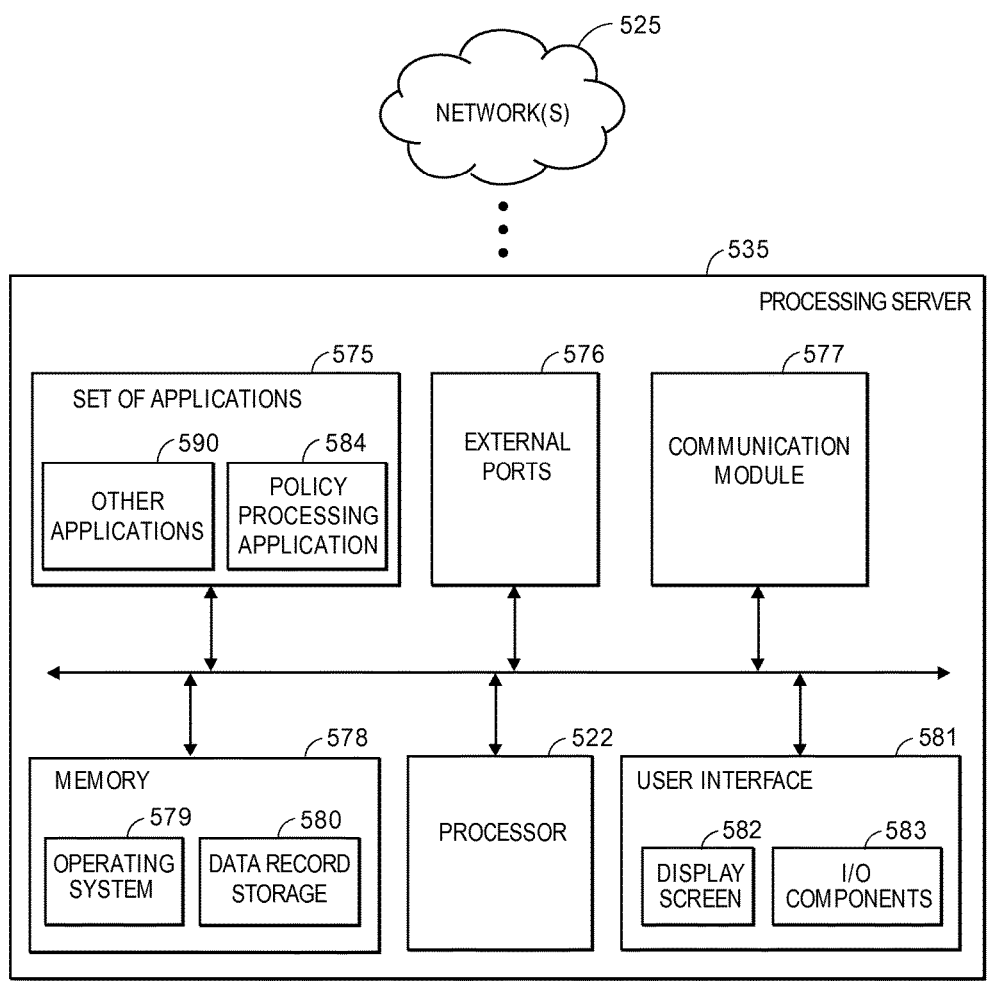
FIG. 5 is a block diagram of an exemplary processing server in accordance with some embodiments.

FIG. 5 illustrates a diagram of an exemplary processing server 535 (such as the processing server 135 discussed with respect to FIG. 1) in which the functionalities as discussed herein may be implemented. It should be appreciated that the processing server 535 may be associated with an insurance provider, as discussed herein. In one embodiment, the processing server may be configured with the same functionality as that of the controllers 120, 220 of FIGS. 1 and 2, respectively.

The processing server 535 may include a processor 522, as well as a memory 578. The memory 578 may store an operating system 579 capable of facilitating the functionalities as discussed herein, as well as a set of applications 575 (i.e., machine readable instructions). For instance, one of the set of applications 575 may be a policy processing application 584 configured to manage customer insurance policies. It should be appreciated that other applications 590 are envisioned, such as a device management application configured to analyze image data and facilitate the management of a smart device accordingly.

The processor 522 may interface with the memory 578 to execute the operating system 579 and the set of applications 575. According to some embodiments, the memory 578 may also include a data record storage 580 that stores various information associated with customer insurance policies. The policy processing application 584 may interface with the data record storage 580 to retrieve relevant information that the policy processing application 584 may use to manage insurance policies, generate notifications, and/or perform other functionalities. Further, the device management application may interface with the data record storage 580 to retrieve a set of occupant profiles and related data. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The processing server 535 may further include a communication module 577 configured to communicate data via one or more networks 525. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. For instance, the communication module 577 may receive, via the network 525, image data captured by image sensors disposed within a property.

The processing server 525 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the processing server 535 via the user interface 581 to process insurance policies and/or perform other functions. In some embodiments, the processing server 535 may perform the functionalities as discussed herein as part of a "cloud" network or may otherwise communicate with other hardware or software components within the cloud to send, retrieve, and/or otherwise analyze data.

In general, a computer program product in accordance with one embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 522 (e.g., working in connection with the operating system 579) to facilitate the functions as described herein. In this regard, the program code may be implemented in any desired language, and/or may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

VI. Exemplary User Interfaces for Facilitating Device Operation

Figure 6A:
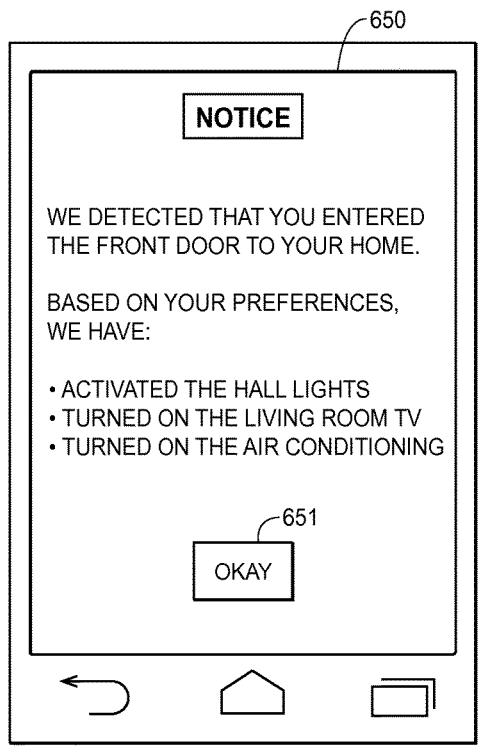
FIGS. 6A and 6B depict exemplary interfaces associated with notifications related to image data analysis, in accordance with some embodiments.
Figure 6B:

FIGS. 6A and 6B illustrate exemplary interfaces associated with example commands, displays, and actions for smart devices. An electronic device (e.g., a mobile device, such as a smartphone) may be configured to display the interfaces and/or receive selections and inputs via the interfaces. For example, a dedicated application associated with an insurance provider (or with a controller) and that is configured to operate on the electronic device may display the interfaces. It should be appreciated that the interfaces are merely examples and that alternative or additional content is envisioned.

FIG. 6A illustrates an exemplary interface 650 including details related to a set of actions performed in response to an individual being detected at a certain location of a property. In particular, the interface 650 may indicate that the individual was detected entering the front door to the home. Further, the interface 650 may indicate that three actions were performed in response to the individual being detected entering the front door: activation of the hall lights, turning on of the living room TV, and turning on of the air condition (or heat, or otherwise adjusting temperature to individual preferences). The interface 650 may enable the user to dismiss the notification using an "OKAY" selection 651.

FIG. 6B illustrates another exemplary interface 655 that includes details related to a set of actions performed in response to a certain circumstance. In particular, the interface 655 may indicate that an individual is detected to have woken up, such as via image data captured at a certain time of day by image sensors located in a hallway outside the individual's bedroom. Further, the interface 655 may indicate that three actions were performed in response to the detected circumstance: turning on of the coffee machine, starting of a hot shower, and activation of a tower warmer (and/or turning on a television or radio to a preferred channel at a preferred sound level). The interface 650 may enable the user to dismiss the notification using an "OKAY" selection 656.

VII. Exemplary Method of Monitoring Device Electrical Usage

In one aspect, a computer-implemented method of controlling a plurality of devices associated with a property may be provided. The property may be populated with a hardware controller in communication with a plurality of devices. The method may include (1) receiving, by the hardware controller via a communication network, image data from a set of image sensors associated with the property; (2) accessing, from memory, at least one occupant profile containing data associated with at least one occupant of the property; (3) comparing, by a processor, the image data to the data contained in the at least one occupant profile to determine that the at least one occupant is present on the property; (4) based upon the data contained in the at least one occupant profile: (i) determining an action to be performed, and (ii) identifying at least one of the plurality of devices to perform the action; and/or (5) directing the at least one of the plurality of devices to perform the action to facilitate providing occupant-location, occupant-activity (e.g., entering the front door, leaving the front door, or waking up or going to sleep), or presence based functionality or services, and/or directing device operation based upon occupant location at the property and/or presence at the property. The method may include additional, less, or alternate actions, including that discussed elsewhere herein, and/or may be implemented via one or more local or remote processors (such as smart home controllers, mobile devices, and/or insurance provider remote servers), and/or implemented via computer-executable instructions stored on non-transitory computer-readable medium or media.

In an implementation, the method may further include determining, based upon the image data, a location of the property where the at least one occupant is located; wherein determining the action to be performed may be further based upon the location of the property. Further, in an implementation, the method may further include determining, based upon the image data, an activity being performed by the at least one occupant; wherein determining the action to be performed may be further based upon the activity being performed by the at least one occupant.

Exemplary activities being performed by the at least one occupant may include waking up; getting dressed; eating a meal (breakfast, lunch, or dinner); cooking a meal; watching television; doing yard work; performing household chores (vacuuming, cleaning dishes, cleaning clothes, folding laundry); and/or other activities. The user activity may be determined from computer analysis of the image data, such as by comparing real-time or near real-time image data or videos taken from house-mounted cameras or smart devices with those stored in a memory or data base. Based upon matches determined by a processor performing one or more computer algorithms, a likely match for the activity that the user is currently performing in the images or video may be selected or otherwise determined by the processor. After which, certain device settings may be retrieved associated with user preferred device settings corresponding to the activity determined.

Based upon time of day and/or time of year, an activity of the user may be used to adjust various smart devices. For instance, upon determining that the user is waking up, such as detecting movement in the images and using time of day (e.g., morning) and/or user location (e.g., moving from bedroom to hallway outside of bedroom), it may be inferred that the user is waking up and getting ready to go to work, and/or cooking or eating breakfast. The user may have certain device setting preferences for such activity, such as turning the A/C for summer months to 75 degrees, or turning the furnace to 70 degrees for winter months, and/or turning on a radio or television at a preferred channel (e.g., early morning news) and at a preferred volume setting. Alternatively, if it is determined that the user is going to bed, such as based upon image or video processor analysis and time of day (and/or lack of movement) and/or location (e.g., master bedroom) comparisons with pre-determined preferences, certain devices may be turned off (e.g., television), or adjusted (e.g., television turned to favorite late night TV show with volume turned down; heat or air conditioning turned down (furnace or A/C unit adjusted) based upon the stored user smart device setting preferences.

In one implementation, accessing the at least one occupant profile may include accessing at least one of a set of images depicting the at least one occupant and a set of physical attributes of the at least one occupant. Further, comparing the image data to the data contained in the at least one occupant profile may include (1) analyzing the image data to detect an individual and a set of characteristics of the individual; and/or (2) comparing the set of characteristics of the individual to the set of physical attributes of the at least one occupant to determine that the at least one occupant is depicted in the image data.

In certain aspects, comparing the image data to the data contained in the at least one occupant profile may include performing a facial recognition (or object recognition or optical character recognition) technique on the image data and the data contained in the at least one occupant profile to determine that the at least one occupant is depicted in the image data.

In a further aspect, accessing the at least one occupant profile may include accessing a set of preferences of the at least one occupant, and determining the action to be performed may include determining the action to be performed according to the set of preferences of the at least one occupant. Moreover, in one implementation, identifying the at least one of the plurality of devices to perform the action may include identifying the at least one of the plurality of devices that is capable of performing the action to comply with the set of preferences of the at least one occupant.

Further, in some aspects, directing the at least one of the plurality of devices to perform the action may include directing the at least one of the plurality of devices to adjust operation (such as adjusting a level of brightness of a light, adjusting a smart thermostat level, adjusting a sound level of an entertainment system, adjusting the number of devices (e.g., smart lights) or off, etc.).

In another implementation, directing the at least one of the plurality of devices to perform the action may include (1) generating a command to perform the action; and/or (2) transmitting, by the hardware controller via the communication network, the command to the at least one of the plurality of devices, wherein the at least of the plurality of devices executes the command.

Additionally, according to some aspects, the method may further include receiving, from the at least one of the plurality of devices via the communication network, a confirmation that the action was performed. In a further implementation, comparing the image data to the data contained in the at least one occupant profile may include determining that the image data depicts the at least one occupant and at least one auxiliary item; and/or determining the action to be performed may include determining the action to be performed based upon the data contained in the at least one occupant profile, and a presence of the at least one auxiliary item.

VIII. Exemplary Hardware Controller

A hardware controller for controlling a plurality of devices associated with a property may be provided. The hardware controller may be in communication with a plurality of devices. The hardware controller may include at least one transceiver configured to receive image data from a set of image sensors associated with the property, a memory adapted to store non-transitory computer executable instructions and a set of occupant profiles, and a processor configured to interface with the at least one transceiver and the memory. The processor may be configured to execute the non-transitory computer executable instructions to cause the processor to (1) access, from the memory, at least one occupant profile of the set of occupant profiles, the at least one occupant profile containing data associated with at least one occupant of the property, (2) compare the image data to the data contained in the at least one occupant profile to determine that the at least one occupant is present on the property, (3) based upon the data contained in the at least one occupant profile: (i) determine an action to be performed, and (ii) identify at least one of the plurality of devices to perform the action, and/or (4) direct the at least one of the plurality of devices to perform the action to facilitate directing device operation based upon occupant presence, occupant activity, or location at the property. The hardware controller may include additional, less, or alternate functionality, including that discussed elsewhere herein.

In an implementation, the processor may be further configured to determine, based upon the image data, a location of the property where the at least one occupant is located; wherein the processor may determine the action to be performed further based upon the location of the property. Further, in an implementation, the processor may be further configured to determine, based upon the image data, an activity being performed by the at least one occupant; wherein the processor may determine the action to be performed further based upon the activity being performed by the at least one occupant.

In certain aspects, to access the at least one occupant profile, the processor may be configured to: access at least one of a set of images depicting the at least one occupant and a set of physical attributes of the at least one occupant. In one implementation, to compare the image data to the data contained in the at least one occupant profile, the processor may be configured to analyze the image data to detect an individual and a set of characteristics of the individual, and/or compare the set of characteristics of the individual to the set of physical attributes of the at least one occupant to determine that the at least one occupant is depicted in the image data. In another implementation, to compare the image data to the data contained in the at least one occupant profile, the processor may be configured to perform a facial recognition technique on the image data and the data contained in the at least one occupant profile to determine that the at least one occupant is depicted in the image data.

In other aspects, to access the at least one occupant profile, the processor may be configured to access a set of preferences of the at least one occupant, and/or to determine the action to be performed, the processor may be configured to determine the action to be performed according to the set of preferences of the at least one occupant. Additionally, in an implementation, to identify the at least one of the plurality of devices to perform the action, the processor may be configured to identify the at least one of the plurality of devices that is capable of performing the action to comply with the set of preferences of the at least one occupant.

In further implementations, to direct the at least one of the plurality of devices to perform the action, the processor may be configured to direct the at least one of the plurality of devices to adjust operation. In some scenarios, to direct the at least one of the plurality of devices to perform the action, the processor may be configured to generate a command to perform the action, and/or transmit, via the transceiver, the command to the at least one of the plurality of devices, wherein the at least of the plurality of devices executes the command.

In additional implementations, the processor may further be configured to receive, from the at least one of the plurality of devices via the transceiver, a confirmation that the action was performed. In certain aspects, to compare the image data to the data contained in the at least one occupant profile, the processor may be configured to determine that the image data depicts the at least one occupant and at least one auxiliary item, and to determine the action to be performed, the processor may be configured to determine the action to be performed based upon the data contained in the at least one occupant profile, and a presence of the at least one auxiliary item.

IX. Additional Embodiments

In another aspect, a computer-implemented method of smart home control and/or automation to facilitate prevention, reduction, and/or mitigation of insurance-related events may be provided. The method may include (1) receiving, at or via a remote processor (such as one or more remote processors or servers associated with an insurance provider), a wired or wireless communication or data transmission sent from, and/or data (e.g., audio and image data) collected by, (a) a mobile device of an insured, (b) one or more smart devices located within, or within a vicinity of, an insured home, and/or (c) smart home controller or network (e.g., a smart home controller or network in wired or wireless communication with the mobile device and/or one or more smart devices); (2) analyzing, at or via the remote processor, the wired or wireless communication or data transmission, and/or data, received to determine an insurance-related event has occurred or a likelihood of the insurance-related event happening; and/or (3) when it is determined that the insurance-related event has occurred or has the likelihood of happening from analysis of the wired or wireless communication or data transmission, and/or data, received, the remote processor: (I) may generate a notification or message to send to the insured and cause the notification or message to be presented to the insured, such as on a display associated with (i) the smart home controller; (ii) the mobile device of the insured; and/or (iii) the one or more smart devices located within, or within the vicinity of, the insured home, and/or (II) may direct or control (such as via wired or wireless communication) operation of one or more pieces of smart equipment within the insured home such that prevention, reduction, and/or mitigation of damage caused by, or potentially caused by, the insurance-related event to the insured home is facilitated. The foregoing two methods of smart home control and/or automation may include additional, fewer, or alternate actions, including those discussed elsewhere herein and directly below.

For instance, the one or more smart devices may include smart sensors, smart visual or audio recording equipment, smart cameras, security systems, smart drones, smart robots, and/or smart pet collars. The mobile device may include a smart phone, laptop, tablet, phablet, netbook, notebook, smart glasses, wearable electronic device, smart watch, smart contact lenses, pager, personal digital assistant (PDA), smart pet collar, or other computing device. The smart devices or mobile device may include one or more processors and transceivers, and may be configured for wired or wireless communication (including two-way radio frequency (RF) communication), such as with a smart home controller or an insurance provider remote processor or server. The smart home controller or insurance provider remote processor or server may generate, update, or adjust an insurance policy, premium, rate, or discount based upon the insurance-related event or wired or wireless communication, data transmission, or data received, such as generating, updating, or adjusting an insurance policy covering or associated with the insured, insured home, or items within the insured home or belonging to the insured.

The wired or wireless communication or data transmission, and/or data, received and/or analyzed by the smart home controller or remote processor may indicate that a circuit breaker or GFCI (Ground Fault Circuit Interrupter) has been tripped (that controls electricity to an appliance (e.g., freezer storing food) in a basement, garage, or other area or room not frequented often by the insured for example). In response, and/or based upon the analysis by the smart home controller or remote processor of the wired or wireless communication or data transmission, and/or data received, the smart home controller or remote processor may (1) determine a potential insurance-related event that may occur in the insured home due to the circuit breaker or GFCI tripping (e.g., water damage from a de-energized freezer or sump pump), (2) generate a wireless communication notifying the insured of the potential insurance-related event, and/or (3) transmit the wireless communication to the mobile device of the insured to cause a presentation of a corresponding notification on a display screen of the mobile device.

The wired or wireless communication or data transmission, and/or data, received and/or analyzed by the smart home controller or remote processor may indicate an age of an appliance. In response, and/or based upon the analysis by the smart home controller or remote processor of the wired or wireless communication or data transmission, and/or data received, the smart home controller or remote processor may (1) determine that the appliance needs to be repaired or replaced (such as by determining that the appliance's warranty is about to expire or has expired), and/or (2) generate a recommendation to the insured that the appliance should be either repaired or replaced (e.g., the smart home controller or remote processor may determine that it is more cost effective to replace an old appliance with a new appliance (having a new warranty) than it is to repair the old appliance (having an expired or expiring warranty)).

X. Additional Considerations

As used herein, the term "smart" may refer to devices, sensors, or appliances located within or proximate to a property, and with the ability to communicate information about the status of the device, sensor, or appliance and/or receive instructions that control the operation of the device, sensor, or appliance. In one instance, a smart thermostat may be able to remotely communicate the current temperature of the home and receive instructions to adjust the temperature to a new level. In another instance, a smart water tank may be able to remotely communicate the water level contained therein and receive instructions to restrict the flow of water leaving the tank. In contrast, "dumb" devices, sensors, or appliances located within or proximate to a property require manual control (as compared to automatic or semi-automatic or processor control associated with smart devices). Referring again to the thermostat embodiment, to adjust the temperature on a "dumb" thermostat, a person would have to manually interact with the thermostat. As such, a person is unable to use a communication network to remotely adjust a "dumb" device, sensor, or appliance.

A "smart device" as used herein may refer to any of a smart device, sensor, appliance, and/or other smart equipment that may be located (or disposed) within or proximate to a property. In some embodiments in which an appliance and a sensor external to the particular appliance are associated with each other, "smart device" may refer to both the external sensors and the appliance collectively. Some exemplary devices that may be "smart devices" are, without limitation, valves, piping, clothes washers/dryers, dish washers, refrigerators, sprinkler systems, toilets, showers, sinks, soil monitors, doors, locks, windows, shutters, ovens, grills, fire places, furnaces, lighting, sump pumps, security cameras, and alarm systems. Similarly, an individual associated with the property shall be referred to as the "homeowner," "property owner," or "policyholder," but it is also envisioned that the individual is a family member of the homeowner, a person renting/subletting the property, a person living or working on the property, a neighbor of the property, or any other individual that may have an interest in preventing or mitigating damage to the property.

It should be understood that the smart devices may be considered specific-purpose computers designed to perform specific tasks. For example, a smart window may comprise a processor specifically configured to monitor one or more networks for remotely-generated instructions to cause the smart window to open and/or close. The processor may additionally be specifically programmed to interpret the instructions to generate another instruction to cause a motor component corresponding to the smart window to physically open and/or close the smart window. In addition to the execution of instructions, the processor may also be specifically configured to monitor conditions associated with the smart window and to transmit said conditions via one or more networks. To this end, the processor corresponding to a smart device may be configured solely to perform specific actions indicated by received instructions and to communicate specific conditions associated with the smart device. Accordingly, the processor corresponding to the smart device may not be configurable to perform additional and/or alternative general-purpose functions associated with general-purpose computers. It should be understood that since the present application contemplates a variety of different smart devices, the specific-purpose of each processor may vary between and among the smart devices.

Further, any reference to "home" or "property" is meant to be exemplary and not limiting. The systems and methods described herein may be applied to any property, such as offices, farms, lots, parks, and/or other types of properties or buildings. Accordingly, "homeowner" may be used interchangeably with "property owner."

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to smart home functionality (or home occupant preferences or preference profiles), and/or insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider.

In one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For instance, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For instance, where the hardware modules comprise a general-purpose processor configured using software, the general-purpose processor may be configured as respective different hardware modules at different times. Software may accordingly configure a processor, for instance, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for instance, through the storage and retrieval of information in memory structures to which the multiple hardware modules have access. For instance, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For instance, at least some of the operations of a method may be performed by one or more processors or processor-implemented hardware modules. The performance of certain of the operations may be distributed among the one or more processors, not only residing within a single machine, but deployed across a number of machines. In some exemplary embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for instance, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), personal articles, and/or other types of insurance products. In embodiments as described herein, the insurance providers process claims related to insurance policies that cover one or more properties (e.g., homes, automobiles, personal property), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "includes," "including," "has," "having" or any other variation thereof, are intended to cover a non-exclusive inclusion. For instance, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For instance, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of controlling a plurality of devices associated with a property, the property populated with a hardware controller in communication with the plurality of devices, the method comprising:
    receiving, by the hardware controller via a communication network, image data from a set of image sensors disposed at a location of the property;
    accessing, from memory, at least one occupant profile associated with at least one occupant of the property, the at least one occupant profile containing a set of images depicting the at least one occupant and a set of physical attributes of the at least one occupant;
    analyzing the image data to detect an individual and a set of characteristics of the individual;
    determining that the at least one occupant is depicted in the image data, including:
        comparing the set of characteristics of the individual to the set of physical attributes of the at least one occupant, and
        performing a facial recognition technique on the image data and the set of images contained in the at least one occupant profile;
    determining, by the processor, a set of additional auxiliary items depicted in the image data and associated with the at least one occupant;
    determining, by the processor from the image data, how the at least one occupant is interacting with the set of additional auxiliary items;
    based upon the at least one occupant profile:
        determining, further based upon how the at least one occupant is interacting with the set of additional auxiliary items, an action to be performed, and
        determining, based upon the location of the set of image sensors, at least one of the plurality of devices to perform the action; and
    directing the at least one of the plurality of devices to perform the action.

2. The computer-implemented method of claim 1, wherein accessing the at least one occupant profile comprises:
    accessing a set of preferences of the at least one occupant; and wherein determining the action to be performed comprises:
    determining the action to be performed according to the set of preferences of the at least one occupant.

3. The computer-implemented method of claim 2, wherein determining the at least one of the plurality of devices to perform the action comprises:
    determining the at least one of the plurality of devices that is capable of performing the action to comply with the set of preferences of the at least one occupant.

4. The computer-implemented method of claim 1, wherein directing the at least one of the plurality of devices to perform the action comprises:
    directing the at least one of the plurality of devices to adjust operation.

5. The computer-implemented method of claim 1, wherein directing the at least one of the plurality of devices to perform the action comprises:
    generating a command to perform the action; and
    transmitting, by the hardware controller via the communication network, the command to the at least one of the plurality of devices, wherein the at least one of the plurality of devices executes the command.

6. The computer-implemented method of claim 1, further comprising:
    receiving, from the at least one of the plurality of devices via the communication network, a confirmation that the action was performed.

7. The computer-implemented method of claim 1, further comprising:
    determining, based upon the image data, a location of the property where the at least one occupant is located;
    wherein determining the action to be performed is further based upon the location of the property where the at least one occupant is located.

8. The computer-implemented method of claim 1, further comprising:

determining, based upon the image data, an activity being performed by the at least one occupant;

wherein determining the action to be performed is further based upon the activity being performed by the at least one occupant.

9. A hardware controller for controlling a plurality of devices associated with a property, the property populated with a hardware controller in communication with the plurality of devices, comprising:
- at least one transceiver configured to receive image data from a set of image sensors disposed at a location of the property;
- a memory configured to store non-transitory computer executable instructions and a set of occupant profiles; and
- a processor interfacing with the at least one transceiver and the memory, wherein the processor is configured to execute the non-transitory computer executable instructions to cause the processor to:
  - access, from the memory, at least one occupant profile of the set of occupant profiles, the at least one occupant profile associated with at least one occupant of the property, the at least one occupant profile containing a set of images depicting the at least one occupant and a set of physical attributes of the at least one occupant,
  - determine that the at least one occupant is depicted in the image data, including:
    - compare the set of characteristics of the individual to the set of physical attributes of the at least one occupant, and
    - perform a facial recognition technique on the image data and the set of images contained in the at least one occupant profile,
  - determine a set of additional auxiliary items depicted in the image data and associated with the at least one occupant,
  - determine, from the image data, how the at least one occupant is interacting with the set of additional auxiliary items;
  - based upon the data contained in the at least one occupant profile:
    - determine, further based upon how the at least one occupant is interacting with the set of additional auxiliary items, an action to be performed, and
    - determine, based upon the location of the set of image sensors, at least one of the plurality of devices to perform the action, and
  - direct the at least one of the plurality of devices to perform the action.

10. The hardware controller of claim 9, wherein to access the at least one occupant profile, the processor is configured to:
- access a set of preferences of the at least one occupant, and wherein to determine the action to be performed, the processor is configured to:
  - determine the action to be performed according to the set of preferences of the at least one occupant.

11. The hardware controller of claim 10, wherein to determine the at least one of the plurality of devices to perform the action, the processor is configured to:
- determine the at least one of the plurality of devices that is capable of performing the action to comply with the set of preferences of the at least one occupant.

12. The hardware controller of claim 9, wherein to direct the at least one of the plurality of devices to perform the action, the processor is configured to:
- direct the at least one of the plurality of devices to adjust operation.

13. The hardware controller of claim 9, wherein to direct the at least one of the plurality of devices to perform the action, the processor is configured to:
- generate a command to perform the action, and
- transmit, via the at least one transceiver, the command to the at least one of the plurality of devices, wherein the at least one of the plurality of devices executes the command.

14. The hardware controller of claim 9, wherein the processor is further configured to:
- receive, from the at least one of the plurality of devices via the at least one transceiver, a confirmation that the action was performed.

15. The hardware controller of claim 7, wherein the processor is further configured to:
- determine, based upon the image data, a location of the property where the at least one occupant is located;

wherein the processor determines the action to be performed further based upon the location of the property where the at least one occupant is located.

16. The hardware controller of claim 7, wherein the processor is further configured to:
- determine, based upon the image data, an activity being performed by the at least one occupant;

wherein the processor determines the action to be performed further based upon the activity being performed by the at least one occupant.

* * * * *